United States Patent
Ishikawa et al.

[11] Patent Number: 6,074,324
[45] Date of Patent: Jun. 13, 2000

[54] TOROIDAL TYPE CONTINUOUSLY VARIABLE TRANSMISSION

[75] Inventors: Kouji Ishikawa; Nobuo Goto; Hisashi Machida, all of Fujisawa; Takashi Imanishi, Yokohama; Makoto Fujinami, Chiba; Hiroshi Kato, Fujisawa, all of Japan

[73] Assignee: NSK Ltd., Tokyo, Japan

[21] Appl. No.: 09/188,711

[22] Filed: Nov. 10, 1998

[30] Foreign Application Priority Data

Nov. 12, 1997 [JP] Japan ..................... 9-310393
Nov. 14, 1997 [JP] Japan ..................... 9-313465

[51] Int. Cl.⁷ ................. F16H 15/38; C23C 8/22
[52] U.S. Cl. ............... 476/42; 29/893; 148/233; 148/319; 476/40
[58] Field of Search ............ 476/40, 42; 29/893; 148/319, 233

[56] References Cited

U.S. PATENT DOCUMENTS 2,140,012 12/1938 Hayes .......................... 74/200
5,477,976 12/1995 Suzuki et al. .
5,556,348 9/1996 Kokubu et al. ................. 476/40
5,735,769 4/1998 Takemura et al. .............. 476/40

FOREIGN PATENT DOCUMENTS 62-71465  5/1987  Japan .
1-173552 12/1989  Japan .
7-71555   3/1995  Japan .
7-286649 10/1995  Japan .

*Primary Examiner*—Allan D. Herrmann
*Attorney, Agent, or Firm*—Vorys, Sater, Seymour and Pease LLP

[57] ABSTRACT

Improved input and output discs for toroidal type continuously variable transmissions are obtained by select processing techniques to form hardened layers. Processing techniques include, e.g., carburizing, carbonitriding, and high-frequency induction hardening. Shot peening may be used to impart compressive residual surface stress to predetermined disc portions to enhance resistance to cracking.

6 Claims, 10 Drawing Sheets

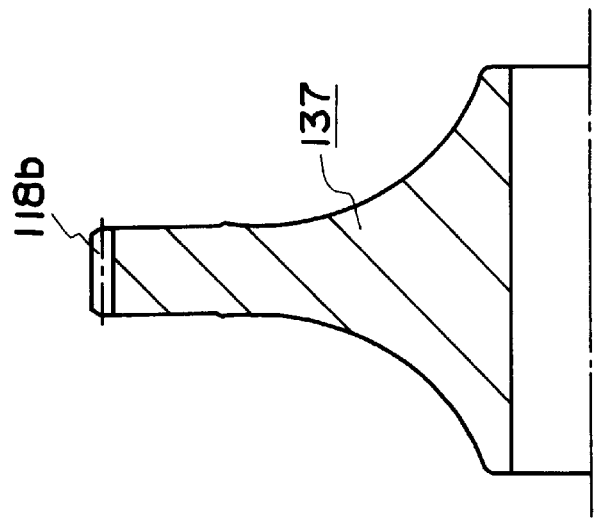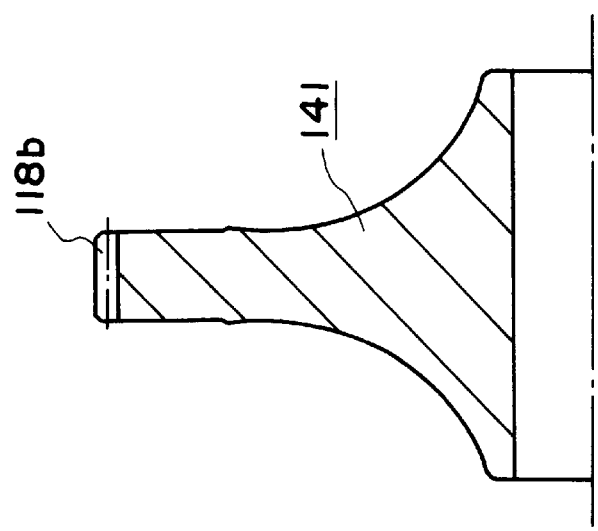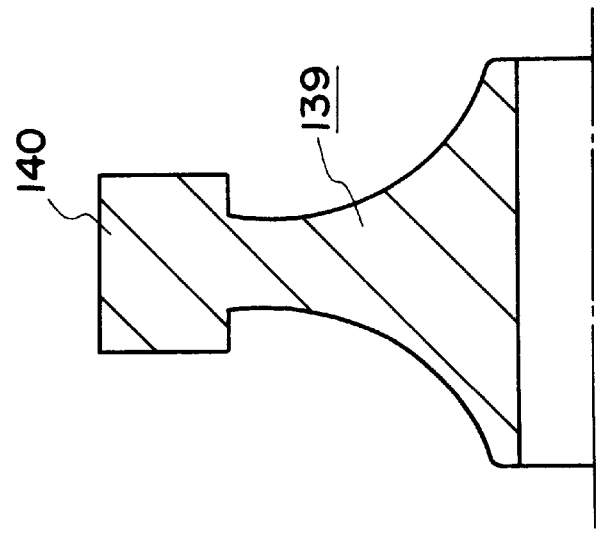

TOROIDAL TYPE CONTINUOUSLY VARIABLE TRANSMISSION

BACKGROUND OF THE INVENTION

1. Field of the Invention

A toroidal type continuously variable transmission according to the present invention is used as, for example, an automatic transmission for an automobile. In particular, the present invention is intended to improve the durability of a power roller section constituting such a toroidal type continuously variable transmission.

In addition, of the toroidal type continuously variable transmissions used as, for example, transmissions for automobiles, the present invention relates to the improvement of a double-cavity toroidal type continuously variable transmission having two power transmission paths in parallel.

2. Related Background Art

The use as a transmission for an automobile of a toroidal type continuously variable transmission such as that shown in FIGS. 7 and 8 is being researched. As disclosed in, for example, Japanese Utility Model Laid-Open No. 62-71465, this toroidal type continuously variable transmission supports an input-side disc 2 concentrically with an input shaft 1 and fixes an output-side disc 4 to the end of an output shaft 3 arranged concentrically with the input shaft 1. A plurality of (normally two or three) trunnions 6, 6 that oscillate around pivots 5, 5 are provided inside a casing in which the toroidal type continuously variable transmission is accommodated. Relative to the axial direction (the lateral direction in FIGS. 7 and 8) of the input- and output-side discs 2 and 4, the pivots 5, 5 are located between the discs 2 and 4, in the direction perpendicular to the axial direction of the discs 2 and 4, at a torsional position relative to the central axis of the discs 2 and 4.

That is, the trunnions 6, 6 each have the pivot 5 on the outer side at either end thereof in such a way that each pivot is concentric with the corresponding trunnion. In addition, the proximal end of displacement shaft 7, 7 is supported by the trunnion 6, 6 in its intermediate portion, and each trunnion 6 can be oscillated around the corresponding pivot 5, 5 to adjust the inclination of the corresponding displacement shaft 7, 7. A power roller 8, 8 is rotatably supported around the displacement shaft 7, 7 supported on the trunnion 6, 6. The power roller 8, 8 is sandwiched between the discs 2 and 4 on the input and output sides. The opposed inner sides 2a and 4a of the input- and output-side discs 2 and 4 each have a cross section consisting of a recessed surface obtained by rotating around the input and output shafts 1 and 3 an circular arc drawn around a point on the pivot 5. The circumferential surface 8a, 8a of the power roller 8, 8 that is formed like a spherically protruding surface is abutted on the inner sides 2a and 4a.

A loading cam pressure apparatus 9 is provided between the input shaft 1 and the input-side disc 2 so as to elastically press the input-side disc 2 toward the output-side disc 4. The pressure apparatus 9 is composed of a cam plate 10 rotating with the input shaft 1 and a plurality of (for example, four) rollers 12, 12 held by a holder 11. A cam surface 13 that is a recessed and protruding surface extending in the circumferential direction is formed on one side (the left side in FIGS. 7 and 8) of the cam plate 10, and a similar cam surface 14 is formed on the outer side (the right side in FIGS. 7 and 8) of the input-side disc 2. The plurality of rollers 12, 12 are rotatably supported around the respective axes located in the radial direction relative to the center of the input shaft 1.

During the use of a toroidal type continuously variable transmission of this configuration, when the cam plate 10 is rotated in response to the rotation of the input shaft 1, the cam surface 13 presses the plurality of rollers 12, 12 against the cam surface 14 on the outer surface of the input-side disc 2. Consequently, the input-side disc 2 is pressed against the power rollers 8, 8, while being rotated due to the pressing of the pair of cam surfaces 13 and 14 against the rollers 12, 12. The rotation of the input-side disc 2 is transmitted to the output-side disc 4 via the power rollers 8, 8 to rotate the output shaft 3 fixed to the output-side disc 4.

If the rotational speed ratio (transmission ratio) between the input and output shafts 1 and 3 is changed and if the speed is first reduced between the input and output shafts 1 and 3, the trunnions 6, 6 are oscillated around the pivots 5, 5 to incline the displacement shafts 7, 7 in such a way that the circumferential surfaces 8a, 8a of the power rollers 8, 8 abut on that portion of the inner side 2a of the input-side disc 2 which is closer to its center and that portion of the inner side 4a of the output-side disc 4 which is closer to its outer circumference, respectively, as shown in FIG. 7. Conversely, to increase the speed, the trunnions 6, 6 are oscillated around the pivots 5, 5 to incline the displacement shafts 7, 7 in such a way that the circumferential surfaces 8a, 8a of the power rollers 8, 8 abut on that portion of the inner side 2a of the input-side disc 2 which is closer to its outer circumference and that portion of the inner side 4a of the output-side disc 4 which is closer to its center, respectively, as shown in FIG. 8. By setting the inclination of each displacement shaft 7, 7 at an intermediate between the values of inclinations in FIGS. 7 and 8, an intermediate transmission ratio can be obtained between the input and output shafts 1 and 3.

Furthermore, FIGS. 9 and 10 show a more specific toroidal type continuously variable transmission described in the micro film of Japanese Utility Model Application No. 63-69293 (Japanese Utility Model Application Laid-Open No. 1-173552). The input-side and output-side discs 2 and 4 are rotatably supported around an input shaft 15 via needle bearing 16, 16, respectively. The cam plate 10 spline-engages the outer circumferential surface of the input shaft 15 located at its end (the left end in FIG. 9) and is prevented by a collar (flange) portion 17 from being moved in a direction in which it leaves the input-side disc 2. Thus, a loading cam pressure apparatus 9 is provided wherein due to the rotation of the input shaft 15, the cam plate 10 and the rollers 12, 12 press the input-side disc 2 toward the output-side disc 4 while rotating the input-side disc 2. An output gear 18 is coupled to the output-side disc 4 using keys 19, 19 so that the output-side disc 4 and the output gear 18 rotate in synchronism. The output gear 18 and other gears (not shown) meshing with the output gear 18 constitute a power output means for rotating the output-side disc 4.

The pivots 5, 5 provided at the respective ends of the pair of trunnions 6, 6 are supported on support posts 20, 20 so as to oscillate and to be displaced in the axial direction (the direction perpendicular to the sheet of FIG. 9 or the lateral direction in FIG. 10). The pair of support posts 20, 20 comprise metal sheets of a sufficient rigidity and are supported inside a casing 22 so as to oscillate and to be displaced in the axial direction of the pivot 5, 5 by externally fitting a circular hole 21 formed in the center of the support post on support pins 24a and 24b fixed to the inner surface of the casing 22 or a side of a cylinder case 23 provided inside the casing 22. A circular support hole 25, 25 is formed at the ends of the support post 20, 20 and the pivot 5, 5 is supported in the support hole 25, 25 via a radial needle bearing 27, 27 including an outer ring 26, 26. Based on this configuration, the trunnion 6, 6 is supported inside the casing 22 so as to oscillate around the pivot 5, 5 and to be displaced in the axial direction thereof.

The displacement shaft 7, 7 is supported in a circular hole 40, 40 formed in the intermediate portion of each trunnion 6, 6 supported inside the casing 2, 2 as described above. The displacement shafts 7, 7 have support shaft sections 28, 28 that are mutually parallel and eccentric and pivot sections 29, 29, respectively. The support shaft section 28, 28 is oscillatorily supported inside the circular hole 40, 40 via a radial needle bearing 30, 30. In addition, the power roller 8, 8 is rotatably supported around the pivot section 29, 29 via a radial needle bearing 31, 31.

The pair of displacement shafts 7, 7 are provided at 180° from each other around the input shaft 15. The pivot section 29, 29 of the displacement shaft 7, 7 is eccentric to the support shaft section 28, 28 in the same direction relative to the rotating direction of the input- and output-side disc 2 or 4 (the lateral direction in FIG. 10). The eccentric direction is almost perpendicular to the direction in which the input shaft 15 is disposed (the lateral direction in FIG. 9 or the direction perpendicular to the sheet of FIG. 10). Thus, the power roller 8 is supported so as to be slightly displaced in the direction in which the input shaft 15 is disposed. As a result, even if the power roller 8 tends to be displaced in the axial direction (the lateral direction in FIG. 9 or the direction perpendicular to the sheet of FIG. 10) of the input shaft 15 due to the difference in the dimensional accuracy of components or elastic deformation during power transmission, this displacement can be absorbed without effecting excessive force on the components.

A thrust rolling bearing such as a thrust ball bearing 32, 32 and a thrust bearing such as a thrust needle bearing 34, 34 bearing thrust loads on an outer ring 33, 33 which is described below, are provided between the outer side of the power roller 8, 8 and the inner side of the intermediate portion of the trunnion 6, 6 in this order from the outer side of the power roller 8, 8. The thrust ball bearing 32, 32 corresponds to a thrust rolling bearing according to this invention, and bears loads on the power roller 8, 8 in the thrust direction while allowing the power roller 8, 8 to rotate. In addition, the thrust needle bearing 34, 34 bears thrust loads provided by the power roller 8, 8 to the outer ring 33, 33 of the thrust ball bearing 32, 32 while allowing the pivot section 29, 29 and the outer ring 33, 33 to oscillate around the support shaft section 28, 28.

A drive rod 35, 35 is coupled to one end of each trunnion 6, 6 (the left end in FIG. 10), and a piston 36, 36 is fixed to the outer circumferential surface of the intermediate portion of the drive rod 35, 35. Each drive piston 36, 36 is fitted in a drive cylinder 37, 37 provided in the cylinder case 23 in an oil tight manner. Furthermore, a pair of rolling bearings 39, 30 are provided between a support wall 38 provided inside the casing 22 and the input shaft 15 so as to rotatably support the input shaft 15 in the casing 22.

In the toroidal type continuously variable transmission configured as described above, the rotation of the input shaft 15 is transmitted to the input-side disc 2 via the pressure apparatus 9. The rotation of the input-side disc 2 is transmitted to the output-side disc 4 via the pair of power rollers 8, 8, and the rotation of the output-side disc 4 is obtained through the output gear 18. To vary the rotational-speed ratio between the input shaft 15 and output gear 18, the pair of drive pistons 36, 36 are displaced in the opposite directions. When the drive pistons 36, 36 are displaced, the pair of trunnions 6, 6 are displaced in the opposite directions, thereby, for example, displacing the power roller 8 in the lower part of FIG. 10 rightward in this figure, while displacing the power roller 8 in the upper part of FIG. 10 leftward in this figure. Consequently, the direction of the tangential force changes that acts on the abutting portions of the circumferential surface 8a, 8a of the power roller 8, 8 and of the inner sides 2a and 4a of the input- and output-side discs 2 and 4. This change in the direction of the force causes the trunnions 6, 6 to oscillate in the opposite directions in FIG. 9 around the pivots 5, 5 pivotably supported on the support posts 20, 20. As a result, as shown in FIGS. 7 and 8 described above, the abutting positions of the circumferential surfaces 8a, 8a of the power rollers 8, 8 and of the inner sides 2a and 4a change to change the rotational-speed ration between the input shaft 15 and the output gear 18.

Due to the elastic deformation of the components during power transmission, when the power roller 8, 8 is displaced in the axial direction of the input shaft 15, the displacement shaft 7, 7 pivotably supporting the power roller 8, 8 slightly oscillates around the support shaft section 28, 28. This oscillation causes the outer side of the outer ring 33, 33 of the thrust ball bearing 32, 32 and the inner side of the trunnion 6, 6 to be displaced relatively. Due to the presence of the thrust needle bearing 34, 34 between these outer and inner surfaces, only a small force is required to effect this relative displacement. Accordingly, only a small force is required to change the inclination of the displacement shaft 7, 7, as described above.

During the operation of the toroidal type continuously variable transmission having the above configuration and operating as described above, a large complicated force is repeatedly applied to both input- and output-side discs 2 and 4 due to the pressing of the power rollers 8, 8 on the discs. For example, during the operation of the toroidal type continuously variable transmission, a thrust load F is provided by the power roller 8 to the inner side 4a of the output-side disc 4 at a point A in FIG. 11. Such a thrust load causes the output-side disc 4 to be elastically deformed to concentrate a large tensile stress in portions B, C, and D in FIG. 11. The sites on which the tensile stress is effected move in the circumferential direction due to the rotation of the output-side disc 4 in response to the operation of the toroidal type continuously variable transmission. Thus, a large tensile stress is repeatedly effected on a portion present in the circumferential direction. Almost the same situation occurs in the input-side disc 2.

The tensile stress repeatedly effected on both input- and output-side discs 2 and 4 damages the discs 2 and 4, for example, cracks them, resulting in destruction. Thus, to provide the toroidal type continuously variable transmission with a sufficient durability, the input- and output-side discs 2 and 4 must be prevented from damage such as cracks despite the tensile stress described above.

If the inner sides 2a and 4a of the input- and output-side discs that are abutted on by the circumferential surfaces 8a, 8a of the power rollers 8, 8 are vibrated in response to the rotation of the discs 2 and 4, respectively, the abutting condition between the circumferential surfaces 8a, 8a and the inner sides 2a and 4a becomes unstable. As a result, vibration may occur during the operation of the toroidal type continuously variable transmission, the speed change states of the power rollers 8, 8 may not be matched, or hunting may occur. Then, due to the vibration, mismatch in speed change state, or hunting, an excessive force is applied to the inner surfaces 2a and 4a abutting on the circumferential surfaces 8a, 8a to degrade the durability of the input- and output-side discs 2 and 4, for example, to cause the inner surfaces 2a and 4a to be peeled off too early.

A toroidal type continuously variable transmission according to this invention is provided in view of this problem.

In order to increase transmissible torque, a double-cavity-type toroidal type continuously variable transmission has been contemplated in which input-side discs 102A and 102B that are outer discs and output-side discs 104, 104 that are intermediate discs are provided around an input shaft 115 corresponding to a rotating shaft according to this invention in such a way that the input-side discs 102A and 102B and the output-side discs 104, 104 are arranged in parallel in the power transmission direction, as shown in FIG. 12. In the structure shown in FIG. 12, an output gear 118a is supported around the intermediate portion of the input shaft 115 so as to rotate around the shaft 115, and the output-side discs 104, 104 are spline-engaged with the respective ends of the output gear 118a. A needle bearings 116, 116 is provided between the inner circumferential surface of each output-side disc 104, 104 and the outer circumferential surface 115 of the input shaft 115 so that the output-side disc 104 is supported around the input shaft 115 so as to rotate around the shaft 115 and to be displaced in the axial direction of the shaft 115. In addition, the input-side discs 102A and 102B are supported at the respective ends of the input shaft 115 so as to rotate with this shaft 115.

One 102A (in the left of FIG. 12) of the input-side discs has its rear surface (the left surface in FIG. 12) abutting on a loading nut 132 to hinder its axial (the lateral direction in FIG. 12) displacement relative to the input shaft 115. On the contrary, the input-side disc 102B opposed to the cam plate 110 is supported on the input shaft 115 via ball splines 133 so as to be displaced in the axial direction. A template spring 134 and a thrust needle bearing 135 are provided in series between the rear surface (the right surface in FIG. 12) of the input-side disc 102B and the front surface (the left surface in FIG. 12) of the cam plate 110. The template spring 134 acts as a pre-loading apparatus for applying a pre-load to the abutting portions of the inner sides 102a and 104a of the discs 102A, 102B, and 104 and the circumferential surfaces 108a, 108a of the power rollers 108, 108.

During the double-cavity-type toroidal type continuously variable transmission of the above configuration, the rotation of the input shaft 115 is transmitted from the pair of input-side discs 102A and 102B to the pair of output-side discs 104, 104 via the plurality of (In the illustrated example, four, that is, two for each pair; but this number may be six, that is, three for each pair) power rollers 108, 108. The rotational power transmitted to the pair of output-side discs 104, 104 is transmitted to the single output gear 118a and is obtained from another gear (not shown) with which the output gear 118a is meshed. Since the rotational force is transmitted from the input shaft 115 to the output gear 118a through two paths arranged in parallel, a large rotational force (torque) can be transmitted. To change the speed change ratio between the input shaft 115 and the output gear 118a, the trunnion 106 bearing the displacement shaft 107 is moved parallel to incline the displacement shaft 107 bearing the power roller 108. A structure for moving the trunnion 106 parallel is the same as in the single-cavity-type toroidal type continuously variable transmission shown in FIGS. 9 and 10. In the double-cavity-type toroidal type continuously variable transmission, however, the supply and ejection of pressure oil to and from the drive cylinders is switched to keep the amounts and directions of movement of the trunnions 106, 106 in synchronism.

In the double-cavity-type toroidal type continuously variable transmission shown in FIG. 12, the pair of output-side discs 104, 104 that are intermediate discs are separate from the output gear 118a, and the pair of output-side discs 104, 104 are spline-engaged with the respective ends of a sleeve section 136 provided at the center of the output gear 118a. This configuration increases the number of components, thereby making the manufacturing, management, and assembly of parts cumbersome and increasing the axial sizes of the installed portions of the pair of output-side discs 104, 104 and output gear 118a.

The increase in the axial sizes of the installed portions increases the axial length of the input shaft 115, thereby increasing the interval between the pair of input-side discs 102A and 102B supported at the respective ends of the input shaft 115. Likewise, the increase in the interval between the pair of input-side discs 102A and 102B increases the amount of the torsional deformation of the input shaft 115 between the input-side discs 102A and 102B during the transmission of rotations, thereby increasing the phase difference between the input-side discs 102A and 102B in the rotating direction. As a result, it becomes difficult to synchronize the transmission of rotations between the input-side disc 102A and the output-side disc 104 in one of the cavities with the transmission of rotations between the input-side disc 102B and the output-side disc 104 in the other cavity, so the efficiency of the double-cavity-type toroidal type continuously variable transmission cannot be ensured easily.

U.S. Pat. No. 2,140,012 describes a structure wherein both axial sides of a single output-side disc corresponding to an intermediate disc are formed as recessed surfaces of a circular cross section and wherein the circumferential surfaces of power rollers are abutted on the recessed surfaces. In this structure described in the U.S. Patent specification, the rotation of the output-side disc is obtained through a cylindrical bottomed drum having at one end an opening that is coupled and fixed to the output-side disc and incorporating one of the input-side discs inside. Thus, it is very difficult to support a power roller provided between one of the input-side discs and the intermediate disc, the structure is very complicated, and a support structure for the power roller must be located inside the drum. Thus, the power roller section including this support structure must be miniaturized. In addition to the need to miniaturize the power roller section, the limited amount of power that can be transmitted by the drum prevents a sufficiently large rotational force from being transmitted.

A method for manufacturing a toroidal type continuously variable transmission and an intermediate disc for the toroidal type continuously variable transmission according to this invention has been invented to eliminate all these inconveniences.

SUMMARY OF THE INVENTION

A toroidal type continuously variable transmission comprises a rotating shaft rotatably supported, an input-side disc that can rotate with the rotating shaft, an output-side disc arranged concentrically with the input-side disc so as to rotate relative to the input-side disc, a plurality of trunnions located in the intermediate portion between the input- and output-side discs in the axial direction of these discs, in the direction perpendicular to the axial direction and at torsional positions relative to the central axis of the discs, the trunnions oscillating at these positions, a plurality of power rollers each rotatably supported on a displacement shaft supported on each trunnion and sandwiched between the input- and output-side discs, and a thrust rolling bearing provided between the outer side of each power roller and the inner side of each trunnion. The opposed inner sides of the input- and output-side discs are formed as recessed surfaces of a circular cross section, and the circumferential surface of each power roller is formed as a spherical protruding surface. The circumferential surface is abutted on the inner sides of the discs.

In particular, the toroidal type continuously variable transmission according to this invention meets at least one of the following conditions (i) to (iii).

(i) Of the surfaces of the input- and output-side discs, shot peening is applied to the outer side, and the inner end surface and that part of the inner circumferential surface which is closer to the inner end, both surfaces existing closer to the inner diameter than the inner side that is a circular recessed surface. Thus, compressive residual stress resulting from shot peening exists in the outer side, the inner end surface, and that part of the inner circumferential surface which is closer to the inner end.

(ii) Heat treated hardened layers are formed on the surfaces of the input- and output-side discs. Of the surfaces of the discs, the outer side and the inner end surface existing closer to the inner diameter than the inner side that is a circular recessed surface have their surface portions cut after the formation of the heat treated hardened layers in order to remove abnormal heat-treated layers from these heat treated hardened layers.

(iii) The amount of whirling of the inner surface of each of the input- and output-side discs relative to the rotational center of each disc is 0.02 mm or less.

The toroidal type continuously variable transmission according to this invention configured in the above manner operates in the same way as in the above earlier structure, in transmitting a rotational force between the input- and output-side discs and changing the speed change ratio between the input- and output-side discs.

In particular, in the toroidal type continuously variable transmission according to this invention, the durability of the input- and output-side discs can be improved when the discs meet the requirements (i) to (iii).

Due to the above configuration and operation of the toroidal type continuously variable transmission, this invention can improve the durability of the input- and output-side discs and thus the durability of the toroidal type continuously variable transmission incorporating both discs.

In addition, the toroidal type continuously variable transmission according to this invention comprises a rotating shaft; a pair of outer discs supported at the respective ends of the rotating shaft in such a way that the inner sides of the outer discs each having a circular recessed cross section are mutually opposed and that the outer discs can rotate in synchronism with the rotating shaft; an intermediate disc both axial sides of which are formed as recessed surface of a circular cross section and which are supported around the rotating shaft so as to rotate relative to the rotating shaft; a gear that is directly formed on the outer circumferential surface of the intermediate disc and that is concentric with the rotating shaft; a plurality of oscillating members each located in the intermediate portion between each outer disc and the intermediate disc in the axial direction of the rotating shaft and oscillating around a pivot located in the direction perpendicular to the axial direction of the rotating shaft and at a torsional position relative to the rotating shaft; a plurality of displacement shafts each protruding from the inner side of each oscillating member; and a plurality of power rollers each rotatably supported by the inner side of each oscillating member around each displacement shaft and sandwiched between the inner side of each input-side disc and the inner side of each output-side disc.

A first hardened layer is formed on that portion of either side of the intermediate disc which abuts on the circumferential surface of each power roller, while a second hardened layer is formed on that portion of the outer circumferential surface of the intermediate disc on which the gear is formed. The effective depth of the first hardened layer is set larger than that of the second hardened layer.

The above intermediate disc can be constructed through, for example, the following steps.

That is, the above intermediate disc can be constructed through the following steps (1) to (7).

(1) First step of forging or cutting a metal material to form a work material.

(2) Second step of pre-processing both axial sides of the work material to form recessed surfaces of a circular cross section therein in order to obtain a first material having a larger shape than a completed intermediate disc.

(3) Third step of carburizing or carbonitriding the first material to harden the surface portion to obtain a second material.

(4) Fourth step of removing the carburized layer present in the surface portion of a portion of the material closer to the outer circumference on which the gear is to be formed in order to obtain a third material.

(5) Fifth step of forming the gear on the outer circumferential edge of the third material to obtain a fourth material.

(6) Sixth step of carburize-quenching or carbonitride-quenching the fourth material to obtain a fifth material.

(7) Seventh step of finishing both axial sides of the fifth material and the gear section formed on the outer circumferential edge to obtain the intermediate disc.

Between the third step in (3) and the fourth step in (4), a portion of the second material that is at least closer to the outer circumference may be annealed for softening.

The above intermediate disc can also be constructed through the following steps (1)–(7).

(1) First step of forging or cutting a metal material to form the work material.

(2) Second step of pre-processing both axial sides of the work material to form recessed surfaces of a circular cross section therein in order to obtain a first material having a larger shape than a completed intermediate disc.

(3) Third step of carbonization-preventing the surface portion of that portion of the first material closer to its outer circumference on which the gear is to be formed.

(4) Fourth step of carburizing or carbonitriding the carbonization-prevented first material to harden the surface portion to obtain a second material.

(5) Fifth step of forming the gear on the outer circumferential edge of the second material to obtain a third material.

(6) Sixth step of carburize-quenching or carbonitride-quenching the third material to obtain a fourth material.

(7) Seventh step of finishing both axial sides of the fourth material and the gear section formed on the outer circumferential edge to obtain the intermediate disc.

The above intermediate disc can also be constructed through the following steps (1) to (5).

(1) First step of forging or cutting a metal material to form the work material.

(2) Second step of executing pre-processing to form recessed surfaces of a circular cross section in the respective axial sides of the work material while forming the gear section on the outer circumferential surface in order to obtain a first material having a larger shape than a completed intermediate disc.

(3) Third step of semi-carbonization-preventing the surface portion of that portion of the first material closer to its outer circumference on which the gear is to be formed.

(4) Fourth step of carburize-quenching or carbonitride-quenching the first material to obtain a second material.

(5) Fifth step of finishing both axial sides of the second material and the gear section formed on the outer circumferential edge to obtain the intermediate disc.

Furthermore, the above intermediate disc can also be constructed through the following steps (1) to (4).

(1) First step of forging or cutting a metal material to form the work material.

(2) Second step of executing pre-processing to form recessed surfaces of a circular cross section in the respective axial sides of the work material while forming the gear section on the outer circumferential surface in order to obtain a first material having a larger shape than a completed intermediate disc.

(3) Third step of applying high-frequency induction hardening to both axial ends and outer circumferential portion of the first material at different conditions to harden these portions in order to obtain a second material.

(4) Fourth step of finishing both axial sides of the second material and the gear section formed on the outer circumferential edge to obtain the intermediate disc.

In the toroidal type continuously variable transmission according to this invention configured as described above, the single intermediate disc can be used to transmit a rotational force to and from the pair of outer discs. Thus, the axial size of the intermediate-disc installation portion can be reduced to reduce the axial length of the rotating shaft provided on which the intermediate disc is installed. In addition, since the gear is directly formed at the outer circumferential edge of the intermediate disc, the coupling strength between the gear and intermediate disc can be sufficiently increased. This prevents the strength of the coupling portions of the gear and intermediate disc from limiting the magnitude of power that can be transmitted by the toroidal type continuously variable transmission.

In addition, as described above, the axial length of the rotating shaft can be reduced, so the phase difference in the rotating direction between the pair of outer discs supported at the respective ends of the rotating shaft can be reduced to improve the efficiency of transmissions executed by the toroidal type continuously variable transmission.

Furthermore, although both axial sides of the intermediate disc and the gear section formed at the outer circumferential edge of the intermediate disc require different depths of the hardened layer, this invention enables the hardened layer in the intermediate disc to have an optimal depth in each portion. That is, since both axial sides have a large elliptical area in contact with the circumferential surface of the power roller, the maximum shearing stress occurs at a larger depth, requiring a larger depth of the hardened layer. On the contrary, if the depth of the hardened layer in the gear section is too large, the strength (toughness) of the gear root portion decreases. Accordingly, the hardened layer formed on the surface portion of the gear is preferably thinner (shallower) than the hardened layer provided in both axial sides. Since this invention manufactures the intermediate disc using the above processes, it can provide a sufficient durability for both axial sides and the gear section.

Due to the above configuration and operation, this invention can transmit a large rotational force despite its small size, achieve a desired speed change ratio accurately, and provide a very durable double-cavity-type toroidal type continuously variable transmission.

BRIEF DESCRIPTION OF THE DRAWINGS

FIGS. 5A, 5B, and 5C are sectional views showing a half of the intermediate disc and showing its manufacturing method in the order of steps;

DETAILED DESCRIPTION OF THE PREFERRED EMBODIMENTS

Figure 1:
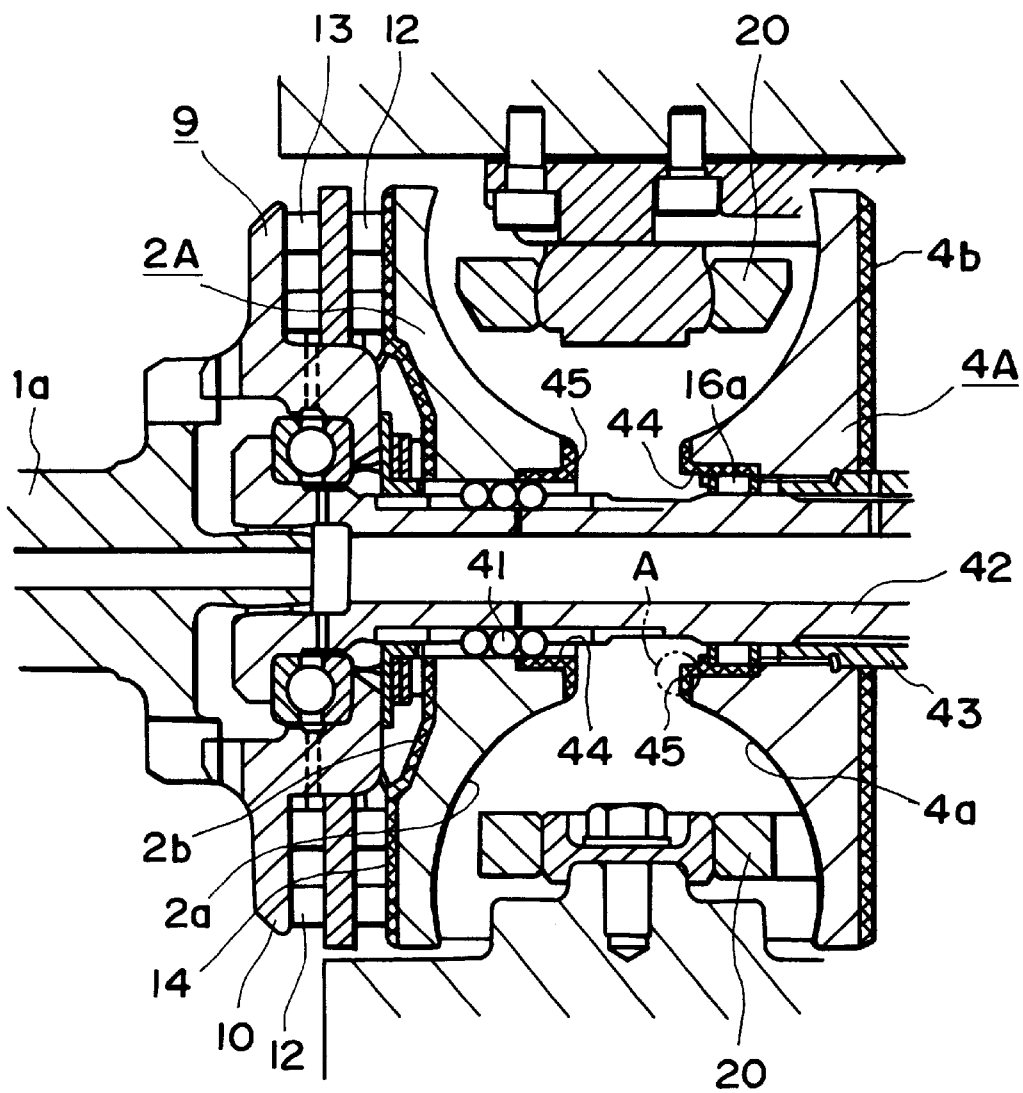
FIG. 1 is a sectional view of an integral part of a toroidal type continuously variable transmission according to a first embodiment of this invention.
Figure 2:
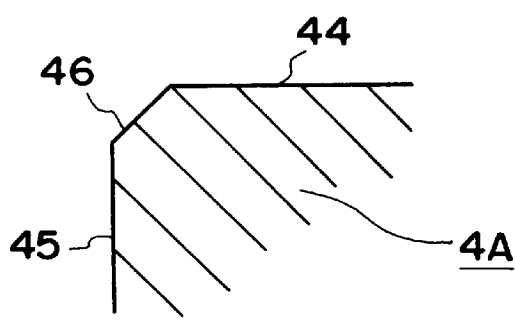
FIG. 2 is an enlarged view of part A in FIG. 1.
Figure 3:
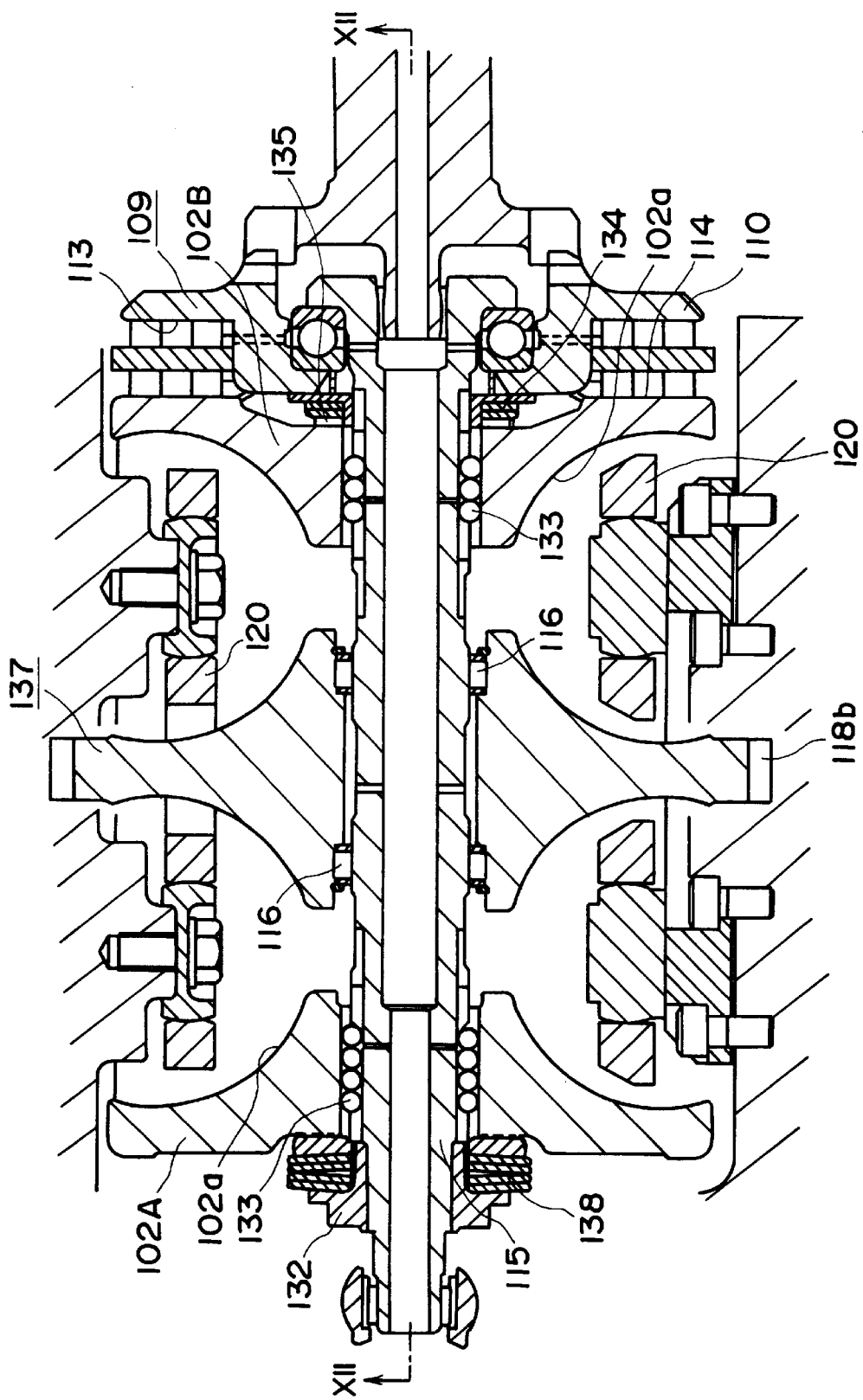
FIG. 3 is a sectional view of an integral part of a toroidal type continuously variable transmission according to a second embodiment of this invention, with the cut position changed for part of the figure.

FIGS. 1 and 2 show the opposed portions of an input- and an output-side discs 2A and 4A, that is, an integral part of a toroidal type continuously variable transmission according to a first embodiment of this invention. FIG. 1 shows a half of a double-cavity-type toroidal type continuously variable transmission in which two pairs of input- and output-side discs 2A and 4A are provided in parallel in the direction of power transmission. The rotation of an input shaft 1a is transmitted to the input-side disc 2A via a loading cam pressure apparatus 9. Furthermore, the rotation of the input-side disc 2A is transmitted to a rotating shaft 42 according to this invention one end of which is coupled to the disc 2A via ball splines 41 provided on the inner circumferential edge of the input disc 2A. Consequently, another input-side disc (not shown) coupled to the other end of the rotating shaft 42 is rotated in synchronism with the input-side disc 2A. In addition, the rotation of the input-side disc 2A is transmitted to an output-side disc 4A via a pair of power rollers 8 (FIGS. 7 to 10) provided in front and rear of the sheet of FIG. 1, respectively, around the rotating shaft 42. The output-side disc 4A, with another output side disc (not shown), are spline-engaged with the respective ends of a sleeve 43 provided around the intermediate portion of the rotating shaft 42. A radial needle bearing 16a is provided between the inner circumferential surface of the inner half (the inner-side 4a-side half or the left half in FIG. 1) of the output-side disc 4A and the outer circumferential surface of the intermediate portion of the rotating shaft 42 to allow the output-side disc 4A and the rotating shaft 42 to rotate relatively. An output gear (not shown) is provided on the outer circumferential surface of the intermediate portion of the sleeve 43 between the output-side disc 4A and another output-side disc so as to allow the output of power transmitted to the pair of output-side discs 4A from the pair of input-side discs 2A.

In the toroidal type continuously variable transmission of the above configuration, hardened layers are formed on the surfaces of the input- and output-side discs 2A and 4A by means of heat treatment such as carburization, carbonitriding, or high-frequency induction hardening. A chamfered portion 46 is formed in each of the connections between the inner circumferential surfaces 44, 44 of the input- and output-side discs 2A and 4A and inner end surfaces 45, 45 existing closer to the inner diameter than the inner sides 2a and 4a of the discs 2A and 4A shown in FIG. 2. The surface roughness of the chamfered portion 46 is set at 6.3 s or less to improve the duarability of the connections.

Furthermore, of the surfaces of the input- and output-side discs 2A and 4A, shot peening is applied to the shaded and latticed portions shown in FIG. 1, that is, the outer sides 2b and 4b, the inner end surfaces 45, 45, the chamfered portions 46, and those parts of the inner circumferential surfaces 44, 44 which are closer to the inner end. Thus, compressive residual stress resulting from shot peening exists in the outer sides 2b and 4b of the discs 2A and 4A, the inner end surfaces 45, 45 thereof, the chamfered portions 46 thereof, and those parts of the inner circumferential surfaces 44, 44 thereof which are closer to the inner end (point (i) described above).

Figure 11:
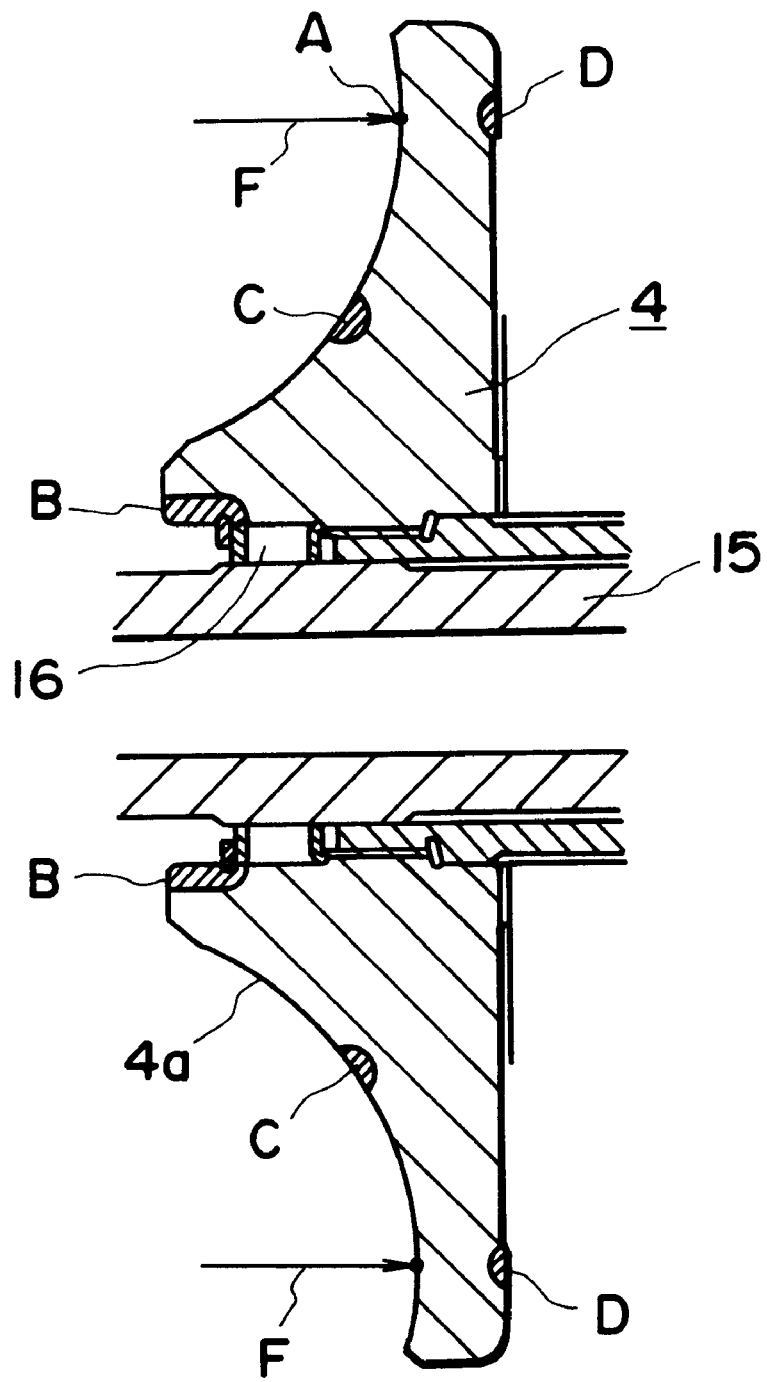
FIG. 11 is a partial sectional view for describing those sites of discs in which a tensile stress is effected.

When compressive residual stress exists in the outer sides 2b and 4b of the input- and output-discs 2A and 4A, the inner circumferential surfaces 44 thereof, the inner end surfaces 45 thereof, and the chamfered portions 46 thereof that are the connections between the surfaces 44 and 45, the discs 2A and 4A is prevented from damage such as cracks even if they are subjected to bending stress during the operation of the toroidal type continuously variable transmission. During the operation of the toroidal type continuously variable transmission, a large tensile stress is effected in the discs 2A and 4A at points B, C, and D in FIG. 11 described above. If, compressive residual stress exists in the above portions including the points B and D, this stress offsets the tensile stress to preclude the discs from damage such as cracks. The compressive stress allowed to remain by shot peening is preferably between about 50 and 90 kgf/mm$^2$.

During the operation of the toroidal type continuously variable transmission, in the input- and output-side discs 2A and 4A, the tensile force is effected not only at the points B and D but also at the point C on the inner sides 2a or 4a of the disc 2A or 4A. The inner side 2a or 4a including the point C is a traction surface that transmits power by abutting on the circumferential surface of a power roller (not shown), and must be smoothed by superfinishing it so that its surface roughness becomes 0.05 Ra or less. Consequently, the inner sides 2a and 4a including the point C cannot be subjected to shot peening. However, abnormal heat-treated layers generated during the formation of the hardened layers, are removed by grinding such as superfinishing for smoothing the surfaces, so the point C is unlikely to suffer damage such as cracks despite a large tensile stress effected at this point. In other words, the inner sides 2a and 4a can withstand a large bearing force for tensile stress.

The above heat treatment is used to form hardened layers on the surface portions of the outer sides 2b and 4b and inner end surfaces 45, 45 of the input- and output-side discs 2A and 4A, and these surface portions are then cut to remove abnormal heat-treated layers from the hardened layers (point (ii) described above). Thus, by removing the abnormal heat-treated layers from the outer sides 2b and 4b and inner end surfaces 45, 45 including the points B and D at which a large tensile stress is effected during the operation of the toroidal type continuously variable transmission, the discs 2A and 4A can be prevented from damage such as cracks even if a large bending stress is effected in the discs 2A and 4A. When a bending stress is applied to the discs 2A and 4A, a large stress concentrates at the points B and D. On the other hand, when the surfaces of the discs 2A and 4A are subjected to heat treatment such as high-frequency induction hardening or carbonitriding in order to harden the surface, abnormal heat-treated layers are generated in the surface portions of the discs 2A and 4A. With such abnormal heat-treated layers, the concentration of stress caused by the bending stress causes the points B and D to be damaged, for example, cracked, thereby damaging or destroying the input- and output-side discs 2A and 4A. In contrast, by removing the abnormal heat-treated layers after the discs 2A and 4A have been heat-treated as described above, the discs 2A and 4A can be prevented from damage such as cracks caused as described above. The removal of the abnormal heat-treated layers and the application of compressive residual stress are individually effective, but their combination is more effective.

Furthermore, the amount of whirling of the inner side 2a or 4a of the input- or output-side discs 2A or 4A relative to the rotational center of the disc 2A or 4A, respectively, is set at 0.02 mm or less (point (iii) described above). The input- and output-side discs 2A and 4A rotate around the transmission shaft 42, but if the distance between the rotational center and portions of the inner sides 2a and 4a that abut on the circumferential surfaces of the power rollers changes, these portions whirl in response to the rotation of the discs 2A and 4A. As described above, such whirling makes the abutting state between the circumferential surfaces of the power rollers and the inner sides 2a and 4a unstable to cause vibration during the operation of the toroidal type continuously variable transmission or to hinder the speed change states of the power rollers from being coordinated. Due to such vibration or the inability to coordinate the speed change states, an excessive force is applied to the inner sides 2a and 4a to degrade the durability of the input- and output-side discs 2A and 4A, for example, to cause the surfaces of these sides to be peeled off earlier.

Thus, by restricting the amount of whirling of the inner sides 2a and 4a of the input- and output-side discs 2A and 4A relative to the rotational center of each discs 2A and 4A to 0.02 mm or less, this can prevent whirling that may degrade the durability of the input- and output-side discs 2A and 4A as described above. The inner sides 2a and 4a of the input- and output-side discs 2A and 4A are ground with the work tolerance of the radius of curvature R of the inner sides 2a and 4a set at a positive value. Thus, since the grinding operation is performed in such a way that the radius of curvature R approaches the tolerance, the processing is relatively easy. In addition, the increase in radius of curvature toward the tolerance is preferable because it reduces the bearing force of the traction surface that is the abutting portion between the inner side 2a or 4a and the circumferential surface of the power roller to improve the durability of the input- and output-discs 2A and 4A and power rollers.

Table 1 below shows the results of experiments conducted by the inventor to determine the effects of the amount of whirling on the operation of the toroidal type continuously variable transmission.

TABLE 1

| Amount of whirling of the disc | Errors |
| --- | --- |
| 0.01 | None |
| 0.02 | None |
| 0.03 | Vibration (minor) |
| 0.04 | Vibration (major) |
| 0.06 | Vibration (major) |
| 0.10 | Hunting |

As is apparent from the description in Table 1, by reducing the amount of whirling down to 0.02 mm or less, its adverse effects on the operation of the toroidal type continuously variable transmission can be restrained to a level that does not practically affect the operation. Although the restriction of the amount of whirling of the discs 2A and 4A is solely effective, its combination with (i) or (ii) described above is more effective.

In this embodiment, the half of the double-cavity-type toroidal type continuously variable transmission is explained. However, the present invention can be applied to a single-cavity-type toroidal type continuously variable transmission.

A second embodiment of this invention is described below.

Figure 12:
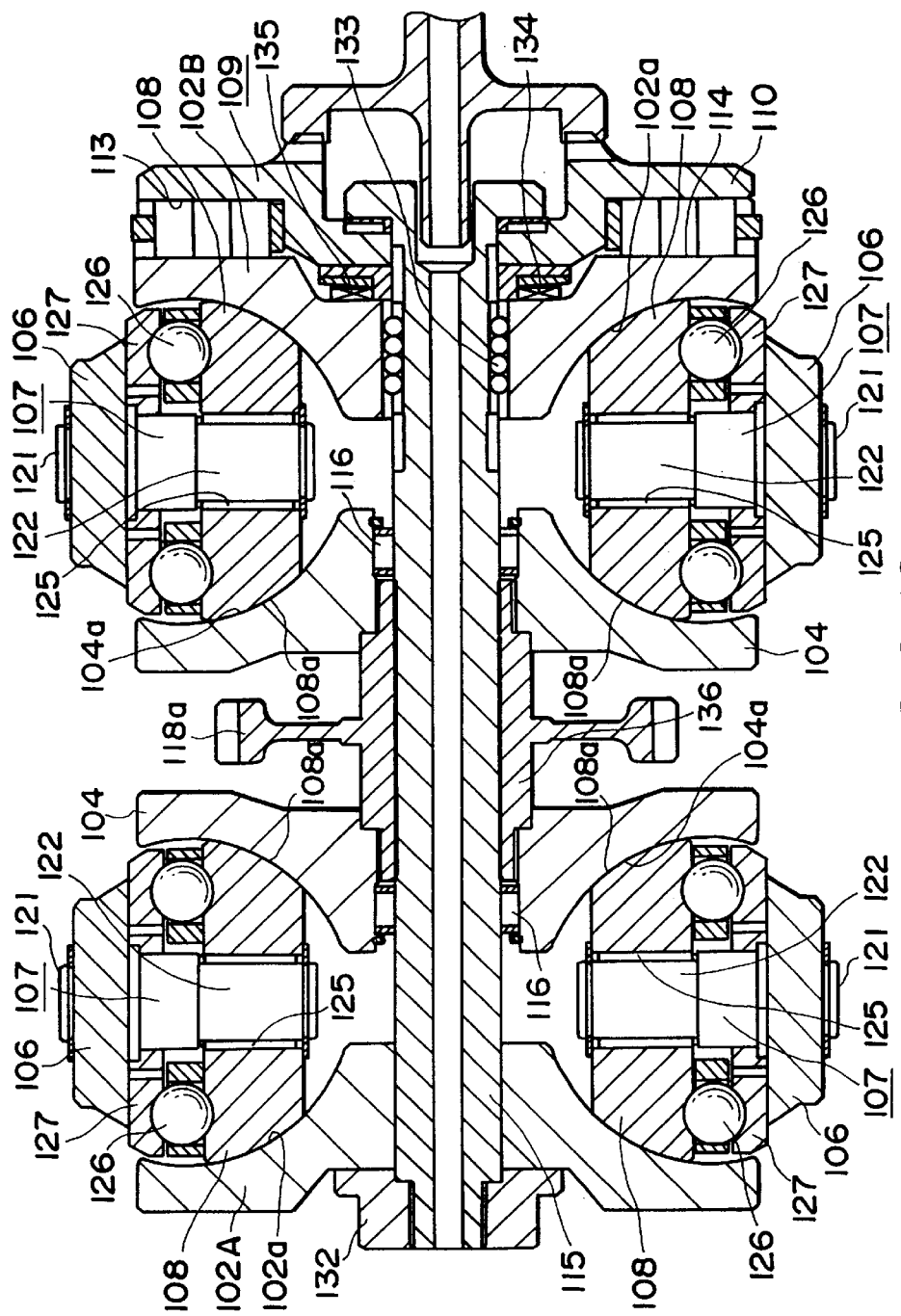
FIG. 12 is a sectional view of an integral part corresponding to a cross section taken along line XII—XII in FIG. 3, showing an example of an earlier double-cavity-type toroidal type continuously variable transmission.

FIGS. 3, 4, and 5A to 5C show an example of a toroidal type continuously variable transmission according to a second embodiment of this invention. This second embodiment is characterized in that a pair of output side discs 104, 104 (see FIG. 12) are combined into a single intermediate disc 137 and in that an output gear 118b is directly formed on the outer circumference of the intermediate disc 137. The other structure and operation are the same as in the earlier double-cavity-type toroidal type continuously variable transmission such as that shown in FIG. 12, so like components have the same reference numerals and the duplicate description is omitted or simplified. The features of this invention and its differences from the structure shown in FIG. 12 are mainly described below. The cut positions in FIGS. 3 and 12 differ by 90° relative to the circumferential direction of the input shaft 115.

A pair of input-side discs 102A and 102B that are each an outer disc are supported at the respective ends of an input shaft 115 corresponding to a rotating shaft according to this invention, via ball splines 133, 133. In the illustrated example, the rear surface (the left surface in FIG. 3) of one 102A (the left disc in FIG. 3) of the input-side discs is abutted on a loading nut 132 via a very resilient template spring 138 to substantially block the axial (the lateral direction in FIG. 3) displacement off the disc relative to the input shaft 115. The template spring 138 intervenes between the input-side disc 102A and the loading nut 132 in this manner in order to reduce the impact effected on the loading nut 132 when the rotational force (torque) to be transmitted by the toroidal type continuously variable transmission rapidly increases. The intermediate disc 137 is supported around the input shaft 115 via a pair of needle bearings 116, 116 so as to rotate relatively to the input shaft 115. The output gear 118b is directly formed on the outer circumferential surface of the intermediate disc 137.

Figure 4:
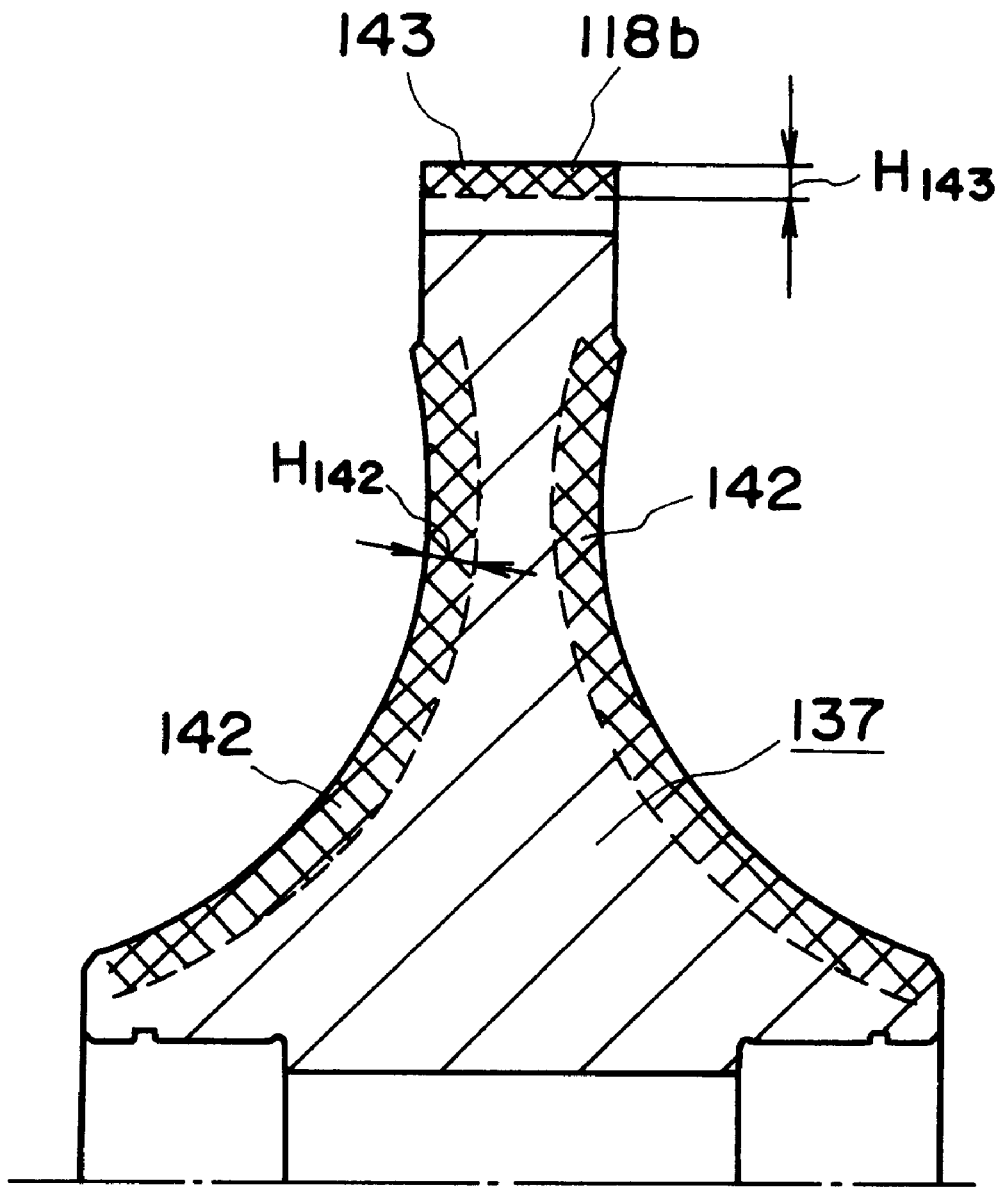
FIG. 4 is a sectional view showing a half of an intermediate disc to describe the depth of a hardened layer in the disc.

First hardened layers 142, 142 are formed on the respective sides of the intermediate disc 137 in those portions of the sides which abut on the circumferential surfaces 108a, 108a of power rollers 108, 108, and a second hardened layer 143 is formed on the outer circumferential surface of the intermediate disc 137 in that portion of this surface on which the output gear 118b is formed, as shown by the shaded and latticed portions in FIG. 4. The effective depth H142 of the first hardened layer 142 is larger than the effective depth H143 of the second hardened layer 143 (H142>H143).

The intermediate disc 137 having the output gear 118b directly formed on the outer circumferential surface and having the first and second hardened layers 142 and 143 of different depths as described above is constructed through the following steps (1) to (7).

(1) First step of forging or cutting a metal material such as carbon steel to form a work material.

(2) Second step of pre-processing the work material to obtain a first material 139 having a larger shape than a completed intermediate disc 137 (see FIGS. 3 and 5C), as shown in FIG. 5A. That is, the second step applies pre-processing such as forging to the work material to form recessed surfaces of a circular cross section on the respective axial sides in order to construct the first material shown in FIG. 5A. The first material 139 is generally thicker than the intermediate disc 137. In particular, the outer circumference of the first material 139 constitutes a thicker portion 140 that is sufficiently thicker than the output gear 118b (see FIGS. 3 and 5C) formed on the outer circumference of the intermediate disc 137.

(3) Third step of carburizing or carbonitriding the first material 139 constructed in the second step in order to harden the surface portion to obtain a second material. That is, the third step carburizes or carbonitrides the first material 139 to form a relatively deep carburized layer on the surface of the first layer 139 in order to obtain the second material the surface of which is hardened. The second material has the same shape as the first material 139 shown in FIG. 5A.

(4) Fourth step of removing the carburized layer present in the surface portion of a portion of the second material closer to the outer circumference on which the output gear 118b is to be formed in order to obtain a third material. Before carrying out the fourth step, the portion of the second material that is closer to the outer circumference on which the output gear 118b is to be formed is annealed for softening as required. Such annealing for softening allows the carburized layer to be removed easily. The fourth step for removing the carburized layer in this manner is executed to allow the portion of the third material that is closer to the outer circumference to be removed in the subsequent fifth step. The fourth step removes the surface layer portion of the thicker portion 140 hardened by the third step in order to allow the output gear 118b to be formed easily on the outer circumference in the subsequent fifth step.

(5) Fifth step of forming the output gear 118b on the outer circumference of the third material to obtain a fourth material 141. That is, the fifth step executes cutting such as turning to remove both axial sides of the thicker portion 140 that is part of the third material in such a way that the thickness of this portion becomes slightly larger than or equal to that of the output gear 118b. In addition, the outer circumference of the third material is intermittently cut to form the output gear 118b in order to obtain the fourth material 141.

(6) Sixth step of carburize-quenching or carbonitiride-quenching the fourth material 141 to obtain a fifth material. The sixth step forms a hardened layer on the surface portion of the output gear 118b from which a soft metal layer is exposed due to the removal of the surface layer portion in the fourth step, thereby hardening the surface portion of the output gear 118b. The depth (thickness) of the carburized layer formed on the surface of the fifth material in the sixth step is smaller than that of the carburized layer formed on the surface of the second material in the third step.

(7) Seventh step of finishing both sides of the fifth material and the output gear 118b formed on the outer circumferential edge of the material to obtain the intermediate disc 137. The seventh step applies finishing such as cutting to both sides of the fifth material and the surface portion of the output gear 118b in order to obtain smooth surfaces having desired shapes.

In the toroidal type continuously variable transmission according to this invention incorporating the intermediate disc 137 constructed in the above manner, the single intermediate disc 137 functioning as a pair of output-side discs can transmit a rotational force to and from the pair of input-side discs 102A and 102B. That is, during the operation of the toroidal type continuously variable transmission according to this invention, the rotation of the input shaft 115 is transmitted from the pair of input discs 102A and 102B to the single intermediate disc 137 via the plurality of power rollers 108, 108 (see FIG. 12). The rotational power transmitted to the intermediate disc 137 is transmitted to the output gear 118b provided on the outer circumference of the intermediate disc 137 and is obtained from another gear (not shown) which the output gear 118b is meshed.

In the toroidal type continuously variable transmission according to this invention, the single intermediate disc 137 acts as a pair of output-side discs, so the axial size of the portion in which the intermediate disc 137 is installed can be reduced to shorten the axial length of the input shaft 115. In addition, the output gear 118b is directly formed on the outer circumference of the intermediate disc 137, the coupling strength between the output gear 118b and the intermediate disc 137 can be sufficiently increased. Accordingly, the strength of the coupling portion between of the output gear 118b and intermediate disc 137 does not limit the magnitude of power that can be transmitted by the toroidal type continuously variable transmission. The magnitude of power that can be transmitted by the toroidal type continuously variable transmission is determined by elements other than the coupling portion between the output gear 118b and the intermediate disc 137, such as the number and size of the power rollers 108, 108. Consequently, these elements can be used to increase the amount of transmissible power.

In addition, by reducing the axial size of the intermediate disc 137 installation portion, the axial length of the input shaft 115 inserted into the intermediate disc 137 can be reduced. Thus, during the operation of the toroidal type continuously variable transmission, even if a force is applied to the input shaft 115 in the torsional direction, the phase difference in the rotating direction between the pair of input-side discs 102A and 102B supported at the respective ends of the input shaft 115 can be reduced to improve the transmission efficiency of the toroidal type continuously variable transmission.

Furthermore, although both axial sides of the intermediate disc 137 and the output gear 118b portion formed on the outer circumference of the intermediate disc 137 require different carburization thickness and different thicknesses of the hardened layer, this invention can set the carburization depth of each portion of the intermediate disc 137 at an optimal value. That is, to ensure a sufficient rolling-fatigue lifetime expectancy, a larger carburization depth must be set for both axial sides of the intermediate disc 137 against which the circumferential surfaces 108a and 108b (see FIG. 12) of the power rollers 108, 108 are pressed against hard because these sides have a large contact ellipse. On the contrary, a raw layer (that is not carburized) must remain at the center of the output gear 118b to harden the surface while maintaining a sufficient toughness in order to restrain abrasion due to meshing with another gear. According to this invention, in forming a carburized layer on both sides, the thicker portion 140 is provided in the portion forming the output gear 118b. Consequently, a sufficiently deep carburized layer can be formed on both axial sides by allowing a raw layer to remain in the portion corresponding to the center of the output gear 118b in the second step. In addition, a carburized layer of a desired depth can be formed on the surface of the output gear 118b in the fifth process. As a result, a carburized layer of an optimal depth can be formed on each of both sides and the output gear 118b to make these portions sufficiently durable.

Setting different depths of hardened layer for both sides of the intermediate disc 137 and the output gear 118b formed on the outer circumference of the intermediate disc 137 as described above can be achieved not only by the invention described in the embodiments but also by the claimed invention. The intermediate disc 137 obtained by the claimed invention can provide the same operations and effects as described above.

Figure 6:
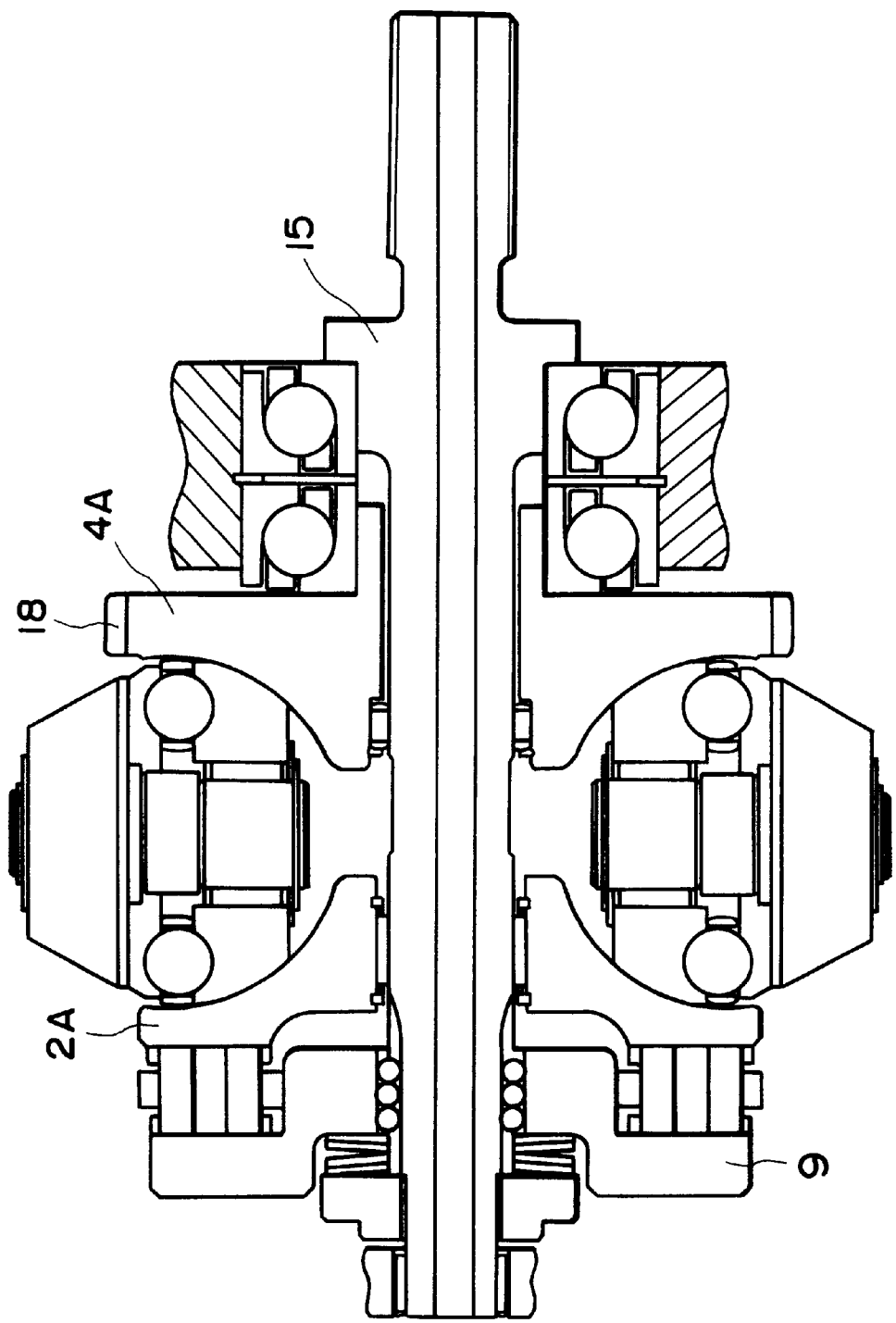
FIG. 6 is a sectional view showing an example in which this invention is applied to a single-cavity-type toroidal type continuously variable transmission.
Figure 7:
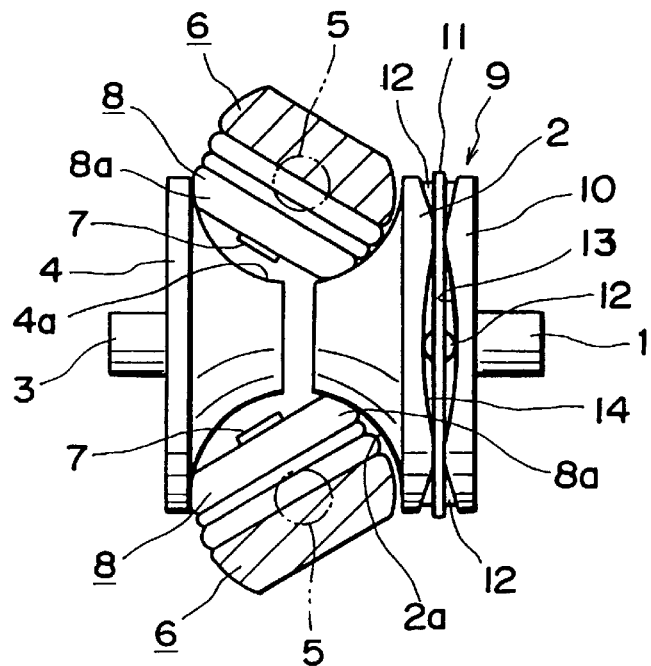
FIG. 7 is a schematic side view showing the basic configuration of the toroidal type continuously variable transmission during the maximum deceleration.
Figure 8:
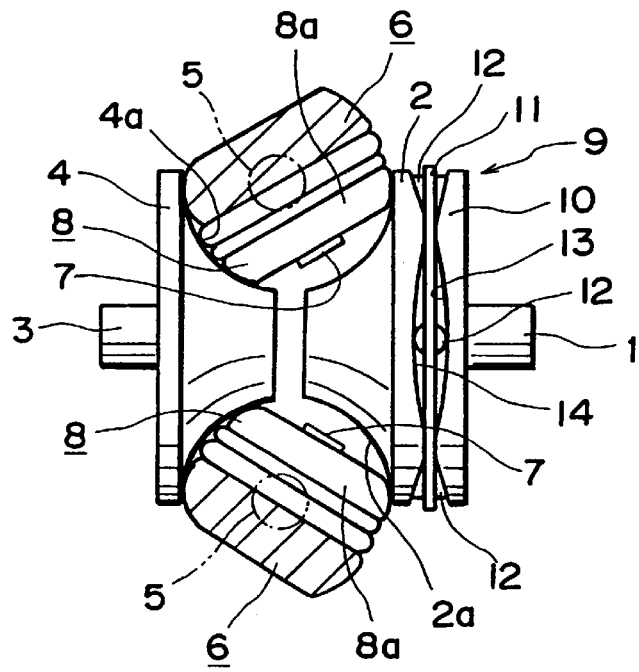
FIG. 8 is a schematic side view showing the basic configuration of the toroidal type continuously variable transmission during the maximum acceleration.
Figure 9:
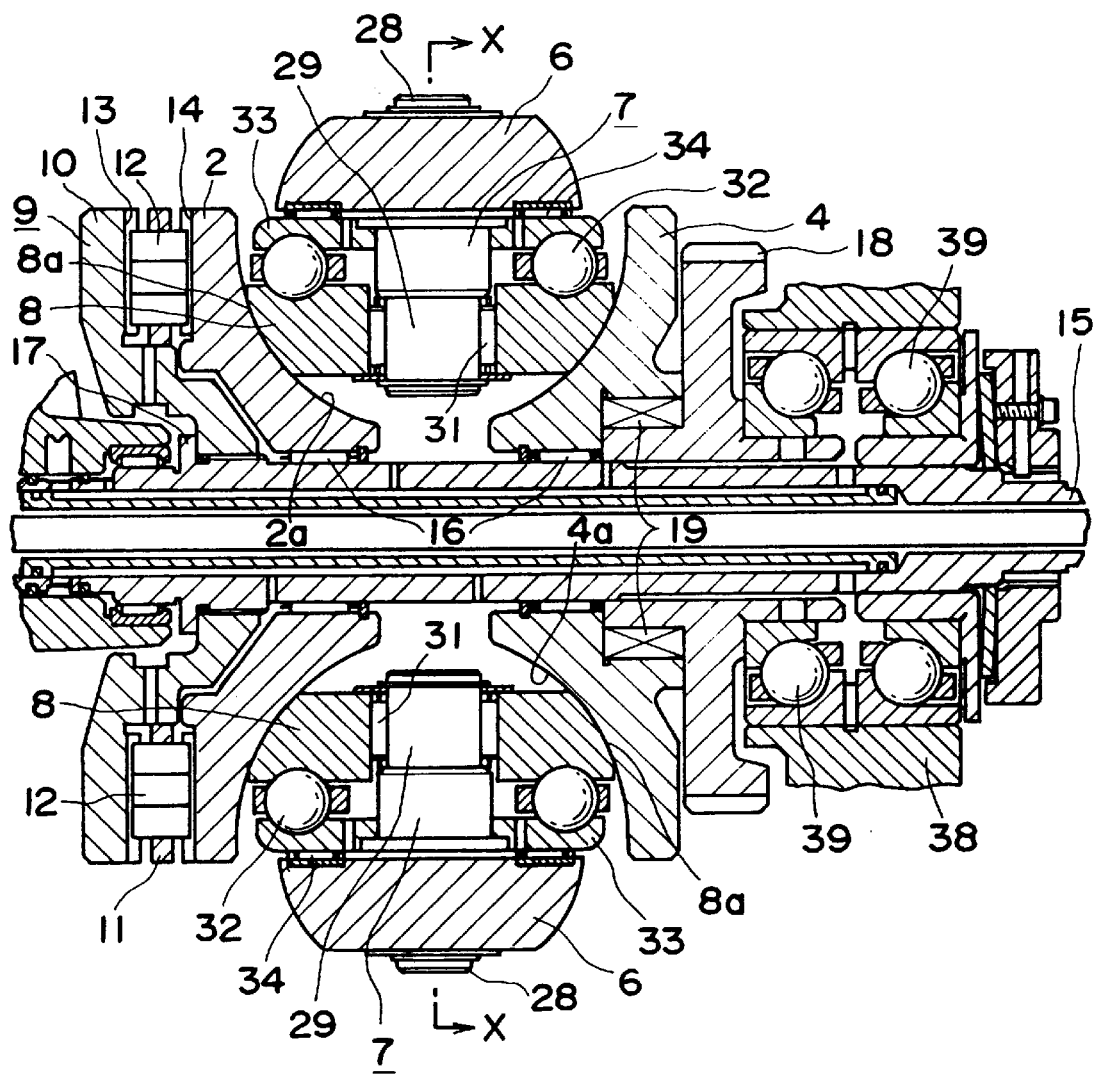
FIG. 9 is a sectional view of an integral part of an example of a known specific structure.
Figure 10:
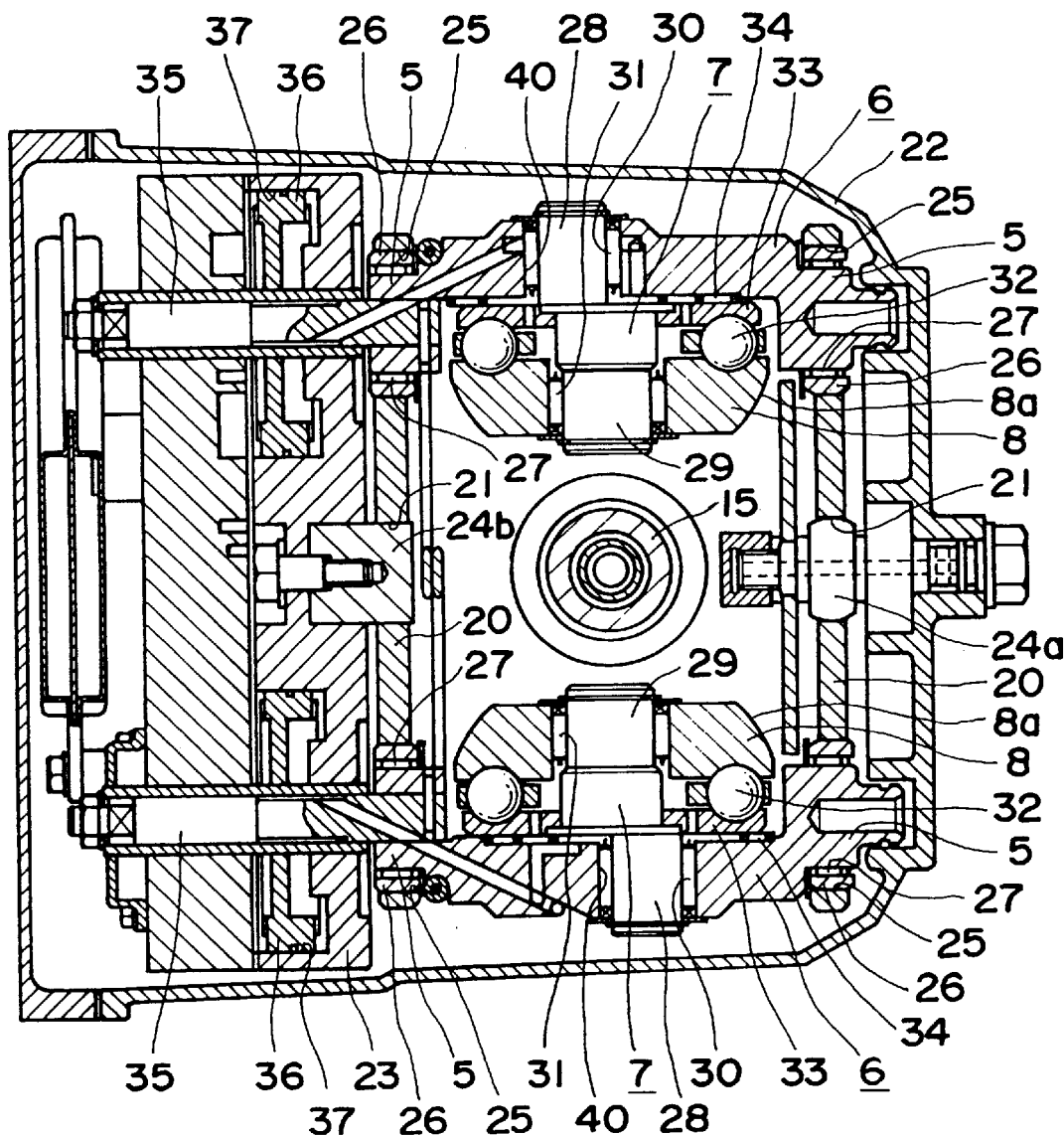
FIG. 10 is a sectional view taken along line X—X in FIG. 9.

As shown in FIG. 6, the output-side disc 18 and the output gear 4A can be integrated together in a single-cavity-type toroidal type continuously variable transmission as in the above embodiments. In this case, the output-side disc 18 and the output gear 4A can have different depths of hardened (carburized) layer.

What is claimed is:

1. A toroidal type continuously variable transmission comprising a rotating shaft rotatably supported, an input-side disc that can rotate with the rotating shaft, an output-side disc arranged concentrically with the input-side disc and supported so as to rotate relative to the input-side disc, a plurality of trunnions located in the intermediate portion between the input- and output-side discs in the axial direction of these discs, in the direction perpendicular to the axial direction and at torsional positions relative to the central axis of the discs, the trunnions oscillating at these positions, a plurality of power rollers each rotatably supported on a displacement shaft supported on each trunnion and sandwiched between the input- and output-side discs, and a thrust rolling bearing provided between the outer side of each power roller and the inner side of each of said trunnions, the opposed inner sides of the input- and output-side discs being formed as recessed surfaces of a circular cross section, the circumferential surface of each of said power rollers being formed as a spherical protruding surface, the circumferential surface being abutted on said inner sides, wherein the transmission meets at least one of the following conditions (i) to (iii):

(i) of the surfaces of said input- and output-side discs, shot peening is applied to the outer side, and the inner end surface and that part of the inner circumferential surface which is closer to the inner end, both surfaces existing closer to the inner diameter than the inner side that is a circular recessed surface, thereby allowing compressive residual stress resulting from shot peening to exist in the outer side, the inner end surface, and that part of the inner circumferential surface which is closer to the inner end;

(ii) heat treated hardened layers are formed on the surfaces of said input- and output-side discs, and of the surfaces of the discs, the outer side and the inner end surface existing closer to the inner diameter than the inner side that is a circular recessed surface have their surface portions cut after the formation of the hardened layers in order to remove abnormal heat-treated layers from these hardened layers;

(iii) the amount of whirling of the inner surface of each of said input- and output-side discs relative to the rotational center of each disc is 0.02 mm or less.

2. A toroidal type continuously variable transmission comprising a rotating shaft; a pair of outer discs supported at the respective ends of the rotating shaft in such a way that the inner sides of the outer discs each having a circular recessed cross section are mutually opposed and that the outer discs can rotate in synchronism with said rotating shaft; an intermediate disc both axial sides of which are formed as recessed surface of a circular cross section and which are supported around said rotating shaft so as to rotate relative to the rotating shaft; a gear that is directly formed on the outer circumferential surface of the intermediate disc and that is concentric with said rotating shaft; a plurality of oscillating members each located in the intermediate portion between each of said outer discs and the intermediate disc in the axial direction of the rotating shaft and oscillating around a pivot located in the direction perpendicular to the axial direction of said rotating shaft and at a torsional position relative to the rotating shaft; a plurality of displacement shafts each protruding from the inner side of each oscillating member; and a plurality of power rollers each rotatably supported by the inner side of each of said oscillating members around each of said displacement shafts and sandwiched between the inner side of each of said input-side discs and the inner side of each of said output-side discs, wherein a first hardened layer is formed on that portion of either side of said intermediate disc which abuts on the circumferential surface of each power roller, while a second hardened layer is formed on that portion of the outer circumferential surface of said intermediate disc on which said gear is formed, and wherein the effective depth of said first hardened layer is set larger than that of said second hardened layer.

3. A toroidal type continuously variable transmission comprising a rotating shaft; a pair of outer discs supported at the respective ends of the rotating shaft in such a way that the inner sides of the outer discs each having a circular recessed cross section are mutually opposed and that the outer discs can rotate in synchronism with said rotating shaft; an intermediate disc both axial sides of which are formed as recessed surface of a circular cross section and which are supported around said rotating shaft so as to rotate relative to the rotating shaft; a gear that is directly formed on the outer circumferential surface of the intermediate disc and that is concentric with said rotating shaft; a plurality of oscillating members each located in the intermediate portion between each of said outer discs and the intermediate disc in the axial direction of the rotating shaft and oscillating around a pivot located in the direction perpendicular to the axial direction of said rotating shaft and at a torsional position relative to the rotating shaft; a plurality of displacement shafts each protruding from the inner side of each oscillating member; and a plurality of power rollers each rotatably supported by the inner side of each of said oscillating members around each of said displacement shafts and sandwiched between the inner side of each of said input-side discs and the inner side of each of said output-side discs, wherein said intermediate disc is constructed through steps (1) to (7):

(1) a first step of forging or cutting a metal material to form a pre-work material;

(2) a second step of pre-processing both axial sides of said pre-work material to form recessed surfaces of a circular cross section therein in order to obtain a first material having a larger shape than a completed intermediate disc;

(3) a third step of carburizing or carbonitriding said first material to harden the surface portion to obtain a second material;

(4) a fourth step of removing the carburized layer present in the surface portion of a portion of said second material closer to the outer circumference on which said gear is to be formed in order to obtain a third material;

(5) a fifth step of forming the gear on the outer circumferential edge of said third material to obtain a fourth material;

(6) a sixth step of carburize-quenching or carbonitiride-quenching said fourth material to obtain a fifth material; and (7) a seventh step of finishing both axial sides of said fifth material and the gear section formed on the outer circumferential edge to obtain said intermediate disc.

4. A toroidal type continuously variable transmission comprising a rotating shaft; a pair of outer discs supported at the respective ends of the rotating shaft in such a way that the inner sides of the outer discs each having a circular recessed cross section are mutually opposed and that the outer discs can rotate in synchronism with said rotating shaft; an intermediate disc both axial sides of which are formed as recessed surface of a circular cross section and which are supported around said rotating shaft so as to rotate relative to the rotating shaft; a gear that is directly formed on the outer circumferential surface of the intermediate disc and that is concentric with said rotating shaft; a plurality of oscillating members each located in the intermediate portion between each of said outer discs and the intermediate disc in the axial direction of the rotating shaft and oscillating around a pivot located in the direction perpendicular to the axial direction of said rotating shaft and at a torsional position relative to the rotating shaft; a plurality of displacement shafts each protruding from the inner side of each oscillating member; and a plurality of power rollers each rotatably supported by the inner side of each of said oscillating members around each of said displacement shafts and sandwiched between the inner side of each of said input-side discs and the inner side of each of said output-side discs, wherein said intermediate disc is constructed through steps (1) to (7):

(1) a first step of forging or cutting a metal material to form a pre-work material;

(2) a second step of pre-processing both axial sides of said pre-work material to form recessed surfaces of a circular cross section therein in order to obtain a first material having a larger shape than a completed intermediate disc;

(3) a third step of carbonization-preventing the surface portion of that portion of said first material closer to its outer circumference on which said gear is to be formed;

(4) a fourth step of carburizing or carbonitriding said carbonization-prevented first material to harden the surface portion to obtain a second material;

(5) a fifth step of forming the gear on the outer circumferential edge of said second material to obtain a third material;

(6) a sixth step of carburize-quenching or carbonitiride-quenching said third material to obtain a fourth material; and (7) a seventh step of finishing both axial sides of said fourth material and the gear section formed on the outer circumferential edge to obtain said intermediate disc.

5. A toroidal type continuously variable transmission comprising a rotating shaft; a pair of outer discs supported at the respective ends of the rotating shaft in such a way that the inner sides of the outer discs each having a circular recessed cross section are mutually opposed and that the outer discs can rotate in synchronism with said rotating shaft; an intermediate disc both axial sides of which are formed as recessed surface of a circular cross section and which are supported around said rotating shaft so as to rotate relative to the rotating shaft; a gear that is directly formed on the outer circumferential surface of the intermediate disc and that is concentric with said rotating shaft; a plurality of oscillating members each located in the intermediate portion between each of said outer discs and the intermediate disc in the axial direction of the rotating shaft and oscillating around a pivot located in the direction perpendicular to the axial direction of said rotating shaft and at a torsional position relative to the rotating shaft; a plurality of displacement shafts each protruding from the inner side of each oscillating member; and a plurality of power rollers each rotatably supported by the inner side of each of said oscillating members around each of said displacement shafts and sandwiched between the inner side of each of said input-side discs and the inner side of each of said output-side discs, wherein said intermediate disc is constructed through steps (1) to (5):

(1) a first step of forging or cutting a metal material to form a pre-work material;

(2) a second step of executing pre-processing to form recessed surfaces of a circular cross section in the respective axial sides of said pre-work material while forming said gear section on the outer circumferential surface in order to obtain a first material having a larger shape than a completed intermediate disc;

(3) a third step of semi-carbonization-preventing the surface portion of that portion of said first material closer to its outer circumference on which said gear has been formed;

(4) a fourth step of carburize-quenching or carbonitride-quenching said first material to obtain a second material; and (5) a fifth step of finishing both axial sides of said second material and the gear section formed on the outer circumferential edge to obtain said intermediate disc.

6. A toroidal type continuously variable transmission comprising a rotating shaft; a pair of outer discs supported at the respective ends of the rotating shaft in such a way that the inner sides of the outer discs each having a circular recessed cross section are mutually opposed and that the outer discs can rotate in synchronism with said rotating shaft; an intermediate disc both axial sides of which are formed as recessed surface of a circular cross section and which are supported around said rotating shaft so as to rotate relative to the rotating shaft; a gear that is directly formed on the outer circumferential surface of the intermediate disc and that is concentric with said rotating shaft; a plurality of oscillating members each located in the intermediate portion between each of said outer discs and the intermediate disc in the axial direction of the rotating shaft and oscillating around a pivot located in the direction perpendicular to the axial direction of said rotating shaft and at a torsional position relative to the rotating shaft; a plurality of displacement shafts each protruding from the inner side of each oscillating member; and a plurality of power rollers each rotatably supported by the inner side of each of said oscillating members around each of said displacement shafts and sandwiched between the inner side of each of said input-side discs and the inner side of each of said output-side discs, wherein said intermediate disc is constructed through steps (1) to (4):

(1) a first step of forging or cutting a metal material to form a pre-work material;

(2) a second step of executing pre-processing to form recessed surfaces of a circular cross section in the respective axial sides of said pre-work material while forming said gear on the outer circumferential surface in order to obtain a first material having a larger shape than a completed intermediate disc;

(3) a third step of applying high-frequency induction hardening to both axial ends and outer circumferential portion of said first material at different conditions to harden these portions in order to obtain a second material; and (4) a fourth step of finishing both axial sides of said second material and the gear section formed on the outer circumferential edge to obtain said intermediate disc.

* * * * *